(12) United States Patent
Johnson

(10) Patent No.: US 10,654,537 B2
(45) Date of Patent: May 19, 2020

(54) BICYCLE SECURITY SYSTEM

(71) Applicant: Patrick Johnson, Dublin (IE)

(72) Inventor: Patrick Johnson, Dublin (IE)

( * ) Notice: Subject to any disclaimer, the term of this patent is extended or adjusted under 35 U.S.C. 154(b) by 0 days.

(21) Appl. No.: 16/471,376

(22) PCT Filed: Dec. 22, 2017

(86) PCT No.: PCT/EP2017/084426
§ 371 (c)(1),
(2) Date: Jun. 19, 2019

(87) PCT Pub. No.: WO2018/115463
PCT Pub. Date: Jun. 28, 2018

(65) Prior Publication Data
US 2020/0094898 A1    Mar. 26, 2020

(30) Foreign Application Priority Data
Dec. 22, 2016   (GB) .................................. 1622037.8

(51) Int. Cl.
B60R 25/10    (2013.01)
B62H 5/00     (2006.01)
B62J 3/00     (2020.01)
B62H 5/20     (2006.01)
H04W 4/48     (2018.01)

(52) U.S. Cl.
CPC ................ B62H 5/20 (2013.01); H04W 4/48 (2018.02)

(58) Field of Classification Search
CPC ................... B62H 5/20; H04W 4/48
See application file for complete search history.

(56) References Cited

U.S. PATENT DOCUMENTS

| | | | |
|---|---|---|---|
| 3,728,675 A | | 4/1973 | Horn |
| 4,006,452 A | | 2/1977 | Giacino |
| 5,815,069 A | * | 9/1998 | Horton ..................... B60R 25/10 307/10.2 |
| 5,949,333 A | * | 9/1999 | Lehmann ................. G08B 3/10 340/309.7 |
| 5,995,053 A | * | 11/1999 | Curtis .................. H01Q 1/1207 343/713 |

(Continued)

FOREIGN PATENT DOCUMENTS

| | | |
|---|---|---|
| CA | 2099395 | 3/2000 |
| EP | 3383731 | 4/2019 |

(Continued)

OTHER PUBLICATIONS

PCT Search Report & Written Opinion dated Apr. 24, 2018 for PCT/EP2017/084426 in the name of Johnson, Patrick filed on Dec. 22, 2017 (10 pages).

(Continued)

Primary Examiner — Quang Pham
(74) Attorney, Agent, or Firm — Fish IP Law, LLP

(57) ABSTRACT

The present disclosure relates to a bicycle security system (130). The system comprises an alarm circuit having an alarm mechanism; and a sensor for sensing the displacement of a bicycle. The sensor is in communication with the alarm mechanism for activating the alarm mechanism if the displacement of the bicycle is greater than a predetermined threshold. A power source for powering the alarm circuit is provided.

18 Claims, 8 Drawing Sheets

(56) References Cited

U.S. PATENT DOCUMENTS

| | | | | |
|---|---|---|---|---|
| 6,060,982 | A | 5/2000 | Holtrop | |
| 9,640,856 | B2* | 5/2017 | Malek | H01Q 1/24 |
| 10,279,855 | B2* | 5/2019 | Wolf | B60R 25/10 |
| 10,336,385 | B2* | 7/2019 | Lippman | B62H 5/20 |
| 2004/0189722 | A1* | 9/2004 | Acres | B62J 6/003 |
| | | | | 715/866 |
| 2007/0188321 | A1* | 8/2007 | Stenlund | B60R 25/33 |
| | | | | 340/539.26 |
| 2008/0165067 | A1* | 7/2008 | Kim | H01Q 1/242 |
| | | | | 343/702 |
| 2009/0201152 | A1* | 8/2009 | Karr | G01S 5/14 |
| | | | | 340/545.6 |
| 2010/0225458 | A1* | 9/2010 | Jow | B62H 5/20 |
| | | | | 340/432 |
| 2015/0343943 | A1* | 12/2015 | Thoday | B60Q 1/38 |
| | | | | 340/435 |
| 2016/0221627 | A1* | 8/2016 | Hines | B62J 11/00 |
| 2017/0160392 | A1* | 6/2017 | Brisimitzakis | G01S 7/062 |

FOREIGN PATENT DOCUMENTS

| | | |
|---|---|---|
| WO | 2015140702 | 9/2015 |
| WO | 2016034957 | 3/2016 |
| WO | 2018115463 | 6/2018 |

OTHER PUBLICATIONS

EP Combined Search & Examination Report for GB1622037.8 in the name of Johnson, Patrick dated Jun. 16, 2017 (2 pages).

* cited by examiner

BICYCLE SECURITY SYSTEM

FIELD OF THE INVENTION

The present disclosure relates to a bicycle security system. In particular, but not exclusively, the present disclosure relates to a bicycle security system which includes an alarm circuit for mounting internally within a bicycle frame.

BACKGROUND

Bicycle theft is a major problem globally. Typically, bicycle theft refers to the theft of the entire bicycle. Bicycle locks may be used to secure a bicycle to structures such as railings, lampposts, parking bays, etc. in an effort to deter thieves. However, thieves have the expertise to either break or 'pick' the locks thereby rendering such locks ineffective. Locks which are an appendage to a bicycle are particularly susceptible to being broken off the bicycle as brute force can be used to remove them rather than specialised tools. Once such a lock has been removed, if there are no remaining traces of the appendage, it may not obvious to an observer that there has been any tampering with any part of the bicycle or indeed that a lock was ever present on the bicycle.

There is therefore a need to provide a bicycle security system which addresses at least some of the drawbacks of the prior art.

SUMMARY

In one aspect, there is provided a bicycle security system comprising:
an alarm circuit having an alarm mechanism; a tilt sensor for sensing the tilt of a bicycle; the tilt sensor being in communication with the alarm mechanism for activating the alarm mechanism if the tilt of the bicycle is greater than a predetermined threshold; and a power source for powering the alarm circuit.

In another aspect, the controller is configured to facilitate remote control of the alarm circuit.

In a further aspect, a housing is provided for accommodating the alarm circuit therein. Advantageously, the housing is configured for being mounted internally within a bicycle frame.

In one aspect, a security mechanism is provided for securing the housing within the bicycle frame.

In another aspect, the security mechanism permanently secures the housing within the bicycle frame. Advantageously, the security mechanism comprises a lock nut.

In one aspect, the frame of the bicycle is manufactured in one complete piece.

In another aspect, the frame of the bicycle is manufactured through means of several independent components which are fixed together in order to form one complete piece.

In one aspect, the bicycle security system is positioned within an integral member of the bicycle frame.

In one aspect, the alarm mechanism comprises an audible alarm. Advantageously, the alarm mechanism comprises a visually perceptible alarm.

In another aspect, the housing has one or more apertures formed thereon such that the visually perceptible alarm is visible externally of the housing. Advantageously, the frame of the bicycle also comprises one or more apertures in the vicinity of the bicycle security system.

In one aspect, a tracking mechanism is provided for tracking the geographical location of the bicycle. Advantageously, the tracking system may be used to activate the alarm such that the alarm is automatically activated when the bicycle is moved from its original co-ordinates.

In another aspect, the housing comprises a mounting means for mating with the bicycle frame.

In one aspect, the mounting means comprises inter-engagable complimentary formations.

In a further aspect, the mounting means comprises a screw for engaging with a threaded portion formed inside one end of an integral member of the the bicycle frame. Advantageously, the screw may be formed from a conical end of the housing which comprises threads on its outer edge. Advantageously, once the engaging screw is engaged in the integral member of the bicycle frame, the security system does not move in relation to the integral member.

In one aspect, the controller comprises a communication module for facilitating remote control using a mobile phone. Advantageously, the communication module is compatible with Bluetooth. Advantageously, the communication module is compatible with wireless technology.

In another aspect, the power source comprises a battery. Advantageously, the battery is rechargeable. In an exemplary embodiment, the battery is operably coupled to a dynamo for facilitating charging thereof.

In another aspect, there is provided a bicycle security system comprising:
an alarm circuit having an alarm mechanism with a wireless communication interface; a sensor for sensing a relative displacement of a bicycle from a first position; the sensor being in communication with the alarm mechanism for activating the alarm mechanism if the bicycle is displaced beyond a predetermined threshold; a power source for powering the alarm circuit; and a housing for accommodating the alarm circuit therein; wherein the housing is configured to be mounted internally within a bicycle frame In another aspect, the housing is configured to mate with a threaded portion formed intergrally with the bicycle frame during manufacturer thereof.

In another aspect, the bicycle security system further comprises a transmitting mechanism.

In a further aspect, the transmitting mechanism comprises a conducting wire which extends between the interior of the of bicycle frame and the exterior of the bicycle frame thereby faciltiating wireless transmission therebetween.

In a further aspect, wherein the transmitting mechanism further comprises an antenna.

In a further aspect, in the antenna comprises a fastener with a tensioning mechanism.

In a further aspect, the tensioning mechanism is a wire coil.

In another aspect, the fastener provides an antenna or a part thereof.

In another aspect, the wire is operably coupled to the antenna or provides a part thereof.

In another aspect, the bicycle security system further comprises a communication module wherein said transmitting mechanism is configured to allow communication from the communication module on the interior of the bicycle frame to the exterior of the bicycle frame via sections of the bicycle frame which are made of a material which facilitates wireless transmission therethrough.

In a further aspect, the material is non-conductive.

In another aspect, the bicycle security system further comprises a tracking system which is configured to activate the alarm such that the alarm is automatically activated when the bicycle is displaced from its original position.

In another aspect, the bicycle security system further comprises a screw for engaging with a threaded portion formed inside one end of an integral member of the the bicycle frame.

In another aspect the screw is formed from outer section of the housing comprising threaded sections.

In another aspect, there is provided a bicycle comprising a bicycle security system according to the first aspect of the invention.

In another aspect, the bicycle comprises a threaded portion formed intergrally within an integral section of the bicycle frame during manufacturer thereof.

In another aspect, the bicycle comprises a transmitting mechanism which facilitates wireless transmission between the interior of the of bicycle frame and the exterior of the bicycle frame In another aspect, the transmitting mechanism is in the form of sections of the bicycle frame which are made of a material which facilitates wireless transmission therethrough.

In another aspect, the material is non-conductive.

These and other features will be better understood with reference to the followings Figures which are provided to assist in an understanding of the present teaching.

BRIEF DESCRIPTION OF THE DRAWINGS

The present teaching will now be described with reference to the accompanying drawings in which.

DETAILED DESCRIPTION OF THE DRAWINGS

Figure 1:
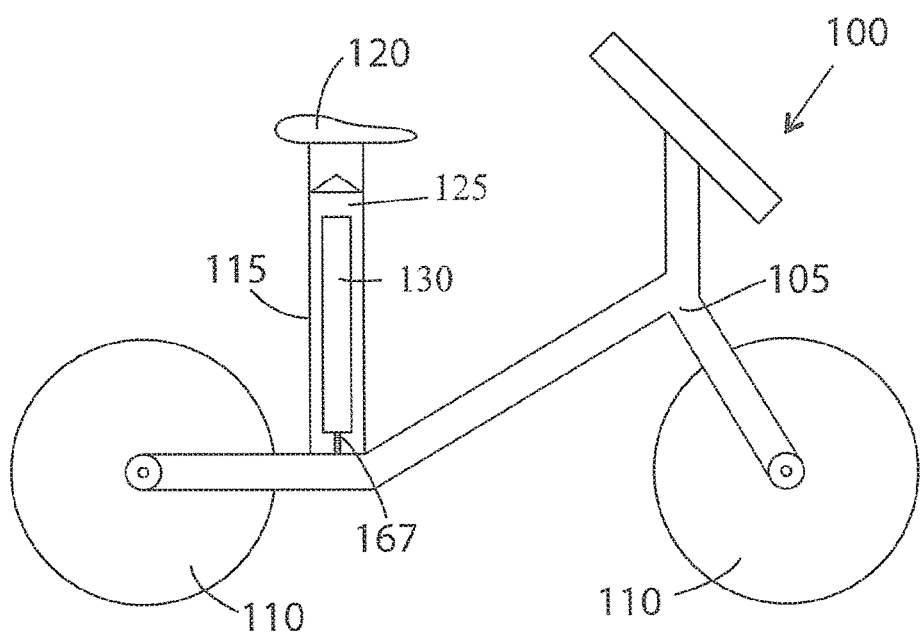
FIG. 1 illustrates a side elevational view of a bicycle which accommodates a bicycle security system in accordance with the present teaching.
Figure 2:
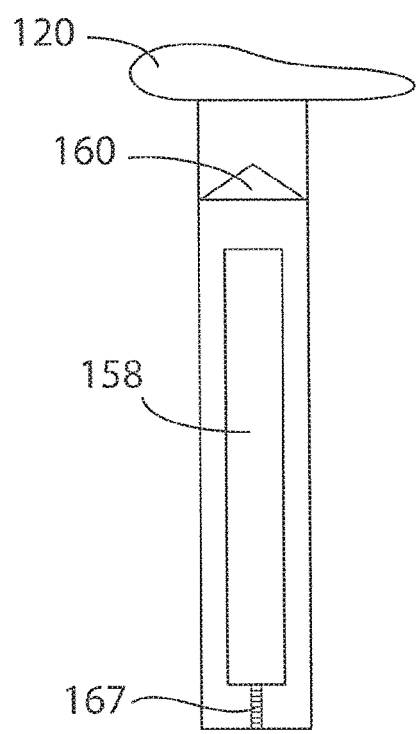
FIG. 2 is a diagrammatic view of a bicycle security system in accordance with the present teaching.
Figure 3:
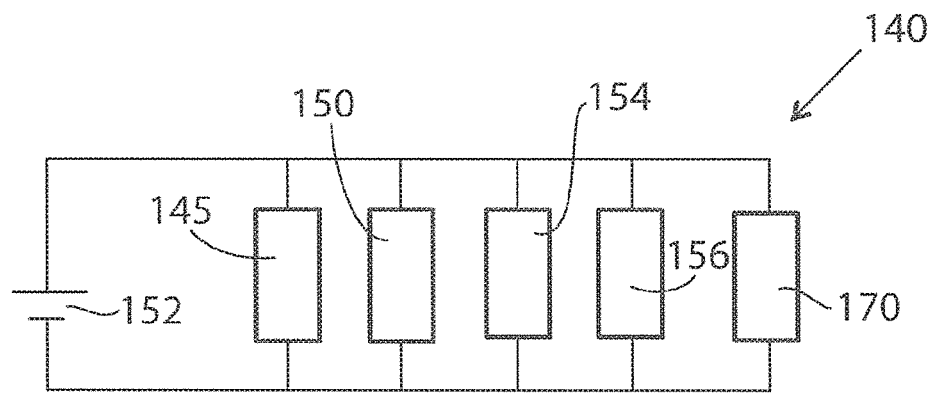
FIG. 3 is a schematic circuit diagram of an alarm circuit of the bicycle security system of FIG. 2.
Figure 4:
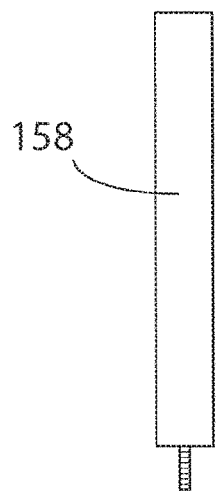
FIG. 4 is a diagrammatic view of details of the bicycle security system of FIG. 2.
Figure 5:
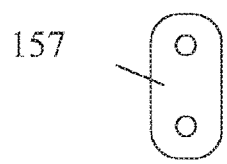
FIG. 5 is a diagrammatic view of details of the bicycle security system of FIG. 2.

The present disclosure will now be described with reference to an exemplary bicycle security system. It will be understood that the exemplary bicycle security system is provided to assist in an understanding of the teaching and is not to be construed as limiting in any fashion. Furthermore, elements or components that are described with reference to any one Figure may be interchanged with those of other Figures or other equivalent circuit elements without departing from the spirit of the present teaching. It will be appreciated that for simplicity and clarity of illustration, where considered appropriate, reference numerals may be repeated among the figures to indicate corresponding or analogous elements.

Referring initially to FIG. 1, a bicycle 100 is illustrated which includes a frame 105 mounted on a pair of ground engaging wheels 110. The frame 105 includes a saddle supporting member 115 on which a saddle 120 is mounted. The frame 105 is typically tubular in order to minimise the weight of the bicycle 100. The saddle supporting member 115 defines a hollow interior region 125 in which a bicycle security system 130 in accordance with the present teaching is mounted in an exemplary embodiment.

The frame 105 may be manufactured in a variety of ways. The frame may be manufactured as one main frame comprising for example; a top tube section, a down tube section, a head tube section, a seat tube section (also know as a saddle support member 115 for the purposes of this specification), a seat stay section and a fork section. Alternatively, the frame may be manufactured as several independently manufactured items which are then bonded together to form one main frame. Manufacturing processes may include one or a combination of the following processes; bladder molding, foam core molding, roll wrapping, filament winding or other suitable bicycle frame manufacturing processes. The frame may be made from carbon fibre, aluminium, carbon steel or any other suitable material which fulfils the essential design requirements of strength, weight and durability.

Regardless of the method of manufacturing, once the frame has been manufactured into a one piece frame 105, each of the tubes sections (for example; top tube section, down tube section, head tube section, seat tube section, seat stay section, fork section, etc.) which make up the frame 105 are known as integral members of the frame 105 and these members are not designed be changed/replaced in normal use of the bicycle 100 during the life of the bicycle 100. Other ancillary items which can be temporarily or semi permanently fixed to the integral members of the frame 105 (such as, but not limited to; wheels, handlesbars, saddle, etc) are known as temporary items and these items are specifically designed to be interchangeable, replaceable, removeable etc. in normal use of the bicycle 100. Temporary items may be removed directly by the bicycle user without substantial hardship or intervention from a bicycle specialist. The bicycle security system 130 is designed to fit within one of the hollow integral members of the frame 105 in order to ensure that access to the bicycle security member 130 is restricted. The bicycle security system 130 is not designed to fit within one of the temporary items as this item could be removed and replaced and thus access to the the bicycle security system 130 would not be sufficiently restricted.

The bicycle security system 130 comprises an alarm circuit 140 having an alarm mechanism 145; a sensor 150 for sensing a predefined variable of a bicycle 100. The sensor 150 is in communication with the alarm mechanism 145 for activating the alarm mechanism 145 if the predefined variable of the bicycle 100 is greater than a predetermined threshold. The sensor 150 may be a mercury tilt switch or the like. Alternative sensors such as but not limited to accelerometers, pressure sensors, proximity sensors, displacement sensors etc. may also be used for sensing the predefined variable of the bicycle. In the exemplary embodiment, a mercury tilt switch is a switch which opens and closes an electrical circuit when it is tilted at certain angles. These type of switches are known in the art and it is not intended to describe them further. A power source 152 is provided for powering the alarm circuit 140. A controller 156 is configured to facilitate remote control of the alarm circuit 140. The controller 156 is operable to receive instructions wirelessly from a remote controller 157 by way of example. The alarm circuit 140 is housed in a housing 158 which has a hollow interior region. In the exemplary embodiment, the housing is provided as a capsule and is configured for being mounted internally within the frame 105.

A security mechanism 160 is provided for securing the housing 158 of the bicycle security system 130 within the saddle support member 115 of the frame 105 or within another substantially hollow integral member of the frame 105 such as the down tube or the top tube. In an exemplary embodiment, the security mechanism 160 may be used to permanently secure the housing 158 within the hollow saddle supporting member 115. In a further exemplary embodiment, the security mechanism 160 comprises a lock nut which is mounted within the saddle support member 115 beneath the saddle 120 which prevents access to the bicycle security system 130. The lock nut may be of a specialised variety such that it can only be opened with a specific lock nut key. This type of specialised lock nut will restrict access to the bicycle security system 130 such that only persons who have the corresponding lock nut key are able to access the bicycle security system 130. The alarm mechanism 145 may comprises an audible alarm and/or a visually perceptible alarm. The housing 158 has one or more apertures formed thereon such that the visually perceptible alarm may be visible externally of the housing 158. The bicycle 100 may also comprise one or more apertures on its frame 100. The housing and frame apertures may assist in providing a transmission pathway for any transmissions which are emitted from the bicycle security system 130 when it is in an activated mode (such as for example radio frequency signals). The frame apertures are formed during the manufacturing process of the frame 105. In an additional embodiment, the frame apertures are partially or substantially covered (for example, with a material akin to mesh) such that the ingress of water into the frame 105 of the bicycle 100 is prohibited but the egress of transmissions from the bicycle security system 130 is enabled. Likewise, in an additional embodiment, the housing apertures may be partially or substantially covered (for example, with a material akin to a mesh) such that the ingress of water into the interior of the housing 158 of the bicycle security system 130 is prohibited but the egress of transmissions from the bicycle security system 130 is enabled. Such a mesh may prevent the ingress of moisture but allow the ingress of transmissions such as radio frequency signals. The housing comprises a mounting means for mating with the bicycle frame 105. The mounting means may include engagable complimentary formations. In exemplary embodiment, the mounting means comprises a screw 167 for engaging with a threaded portion which was formed on the bicycle frame 105 during the manufacturing process of the bicycle frame 105. The threaded portion on the bicycle frame 105 is thus integral to the bicycle frame 105. In order to use an identical process for a large number of bicycles 100, this step could be implemented in a manufacturing process for bicycles 100 which will eventually comprise a bicycle security system 130 according to the invention and for bicycles 100 which will not comprise such a system (for theses bicycles the threaded portion would simply lie dormant within the frame with no screw engaged in its threads).

The mounting means provides sufficient structural stability to prevent the housing 158 from moving within the saddle supporting member 115 (or other integral member of the frame 105). The bicycle security system 130 is also dimensioned to fit snugly within the saddle support member 115 (or other integral member of the frame 105) such that there is no movement within the saddle support member 115 (or other integral member of the frame 105). In a further embodiment the bicycle security system 130 and/or the housing 158 can indeed lend structural support to the integral member within which it is located.

As the frame 105 is largely responsible for providing the strength, rigidity and handling of the bicycle, it is vital that any deviations from the standard bicycle manufacturing process (in the exemplary embodiment these comprise a threaded portion configured to engage with a threaded screw 167) which are made to the integral members of the bicycle 100, are made during the manufacturing process where quality control can be strictly monitored as any substantial modification to the frame 105 which occurs after manufacture could cause unforeseen divergence from the intended design and thereby lead to conditions (for example unplanned stresses and strains) within the core structure of the bicycle which are outside the design criteria of the bicycle and thus manifest themselves as problems with the essential performance and safety of the bicycle.

The alarm circuit 140 may also include a tracking mechanism operable for tracking the geographical location of the bicycle. In the exemplary embodiment, the tracking mechanism comprises a GPS module. In the exemplary example, the tracking mechanism may be used to activate the alarm such that the alarm is automatically activated when the bicycle 100 is displaced from its original position (in this case for example its GPS co-ordinates), or when the bicycle is moved a displaced certain distance from its original original position (this distance could be pre-selected by the bicycle user). The controller 156 comprises a communication module 170 for facilitating remote control using a mobile phone or some other smart device. The communication module 170 may be compatible with Bluetooth or the like. The power source 152 may include a battery which may be rechargeable. The rechargeable battery may be coupled to a dynamo system for facilitating charging thereof.

Figure 8:
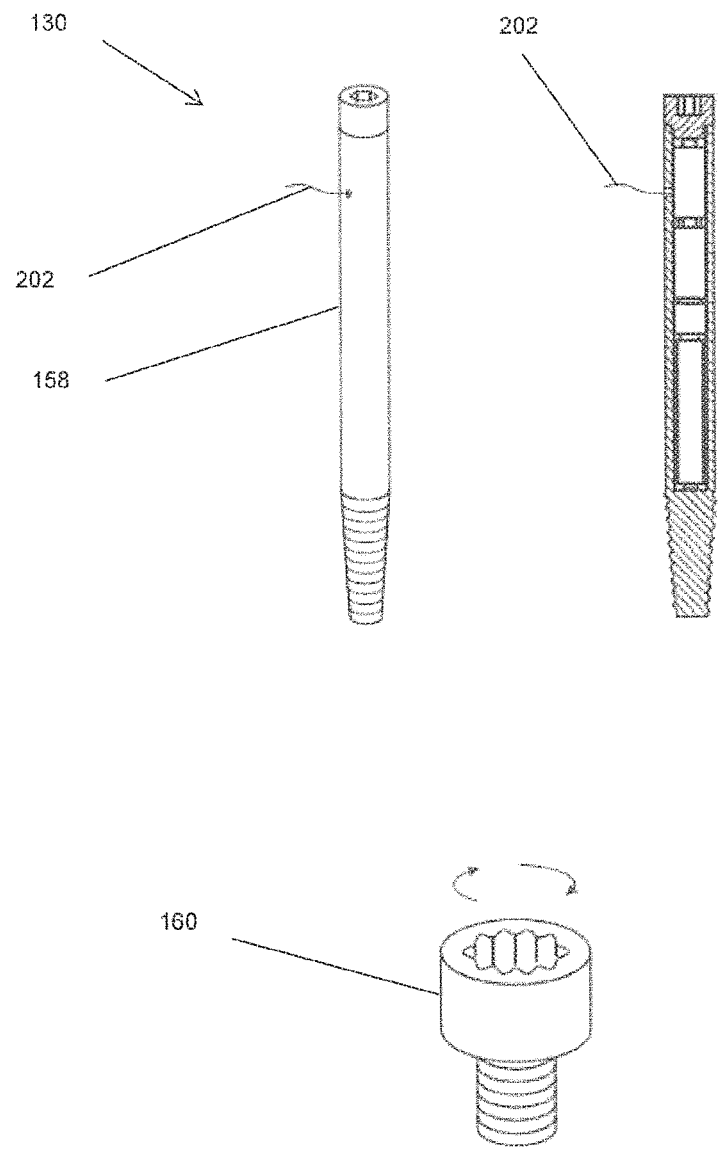
FIG. 8 illustrates a perspective view of a housing of the bicycle security system comprising a transmission mechanism in the form of a copper wire and a high tensile steel cap.
Figure 9:
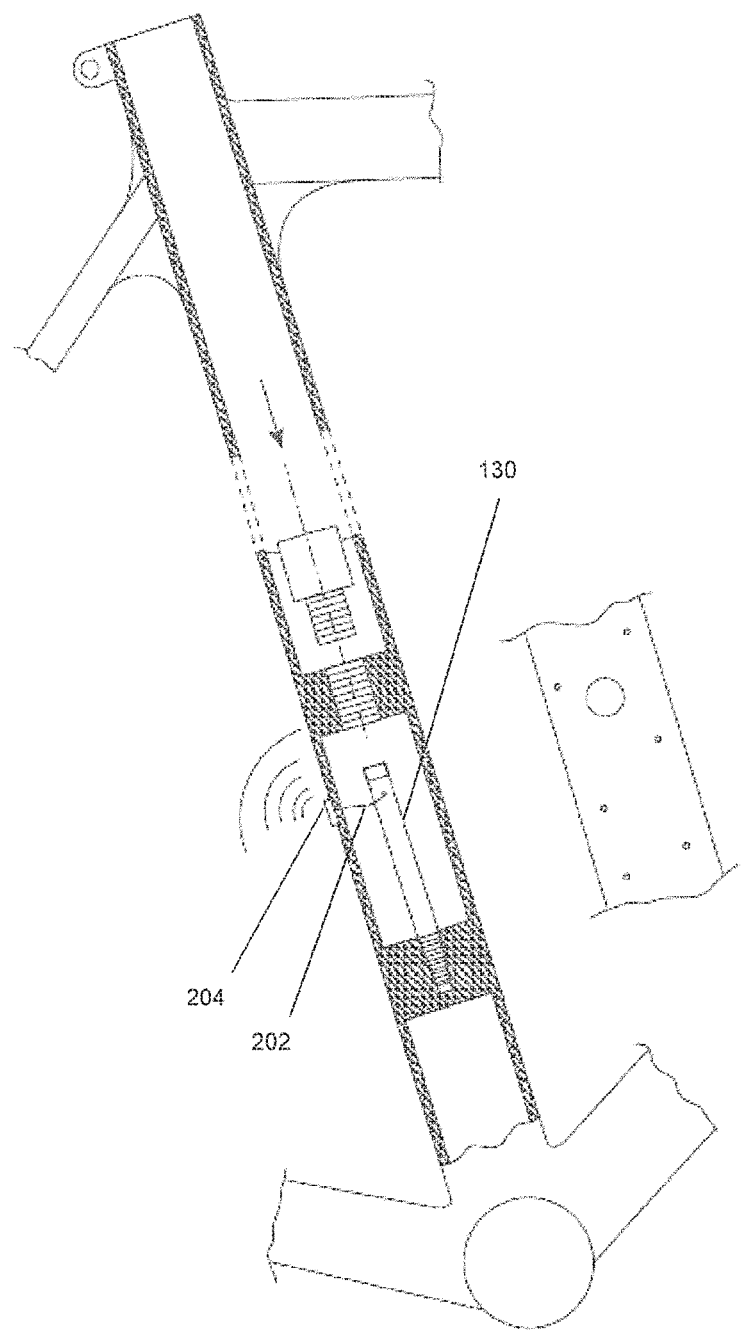
FIG. 9 illustrates a side elevation of the bicycle security system of FIG. 8 in situ within an integral member of the bicycle frame.

It is known that a continuos enclosure of a conductive material can be used to block electromagnetic fields in a phenomenon which is known as a Faraday cell. As the transmissions emanating from the communication module 170 within the bicycle frame 105 are essentially encompassed by a conductive material (such as aluminium, carbon fibre etc.) it will therefore be appreciated by those skilled in the art that under certain circumstances a Faraday shield may created about the communication module 170. In the preferred embodiment, in order to avoid any restrictions on the wireless transmissions emanating from or passing to the bicycle security system 130 which may be caused by the configuration of the bicycle frame 105 within which the bicycle security system 130 is housed (thus creating a Faraday shield), a transmission mechanism may be incorporated into the configuration in order to overcome this Faraday effect. In the exemplary embodiment, as illustrated in FIGS. 8 and 9, this transmission mean is in the form of a conductive wire 202 (such as but not limited to copper) which connects the communication module of the bicycle security system 130 to the outside of the bicycle frame 105, or preferably to a tensioning member 204 such as a high tensile steel cap, through means of one of the perforations in the frame 105 of the bicycle. The tensioning mechanism may comprise a coiled wire. In this configuration, the wire 202, and preferably the tensioning mechanism 204, thus become an antenna for facilitating the transmissions of wireless signals generated by the bicycle security system. It will therefore be appreciated by those skilled in the art that wireless transmissions can pass from the interior to the exterior of the bicycle 100 and vice versa.

Figure 10:
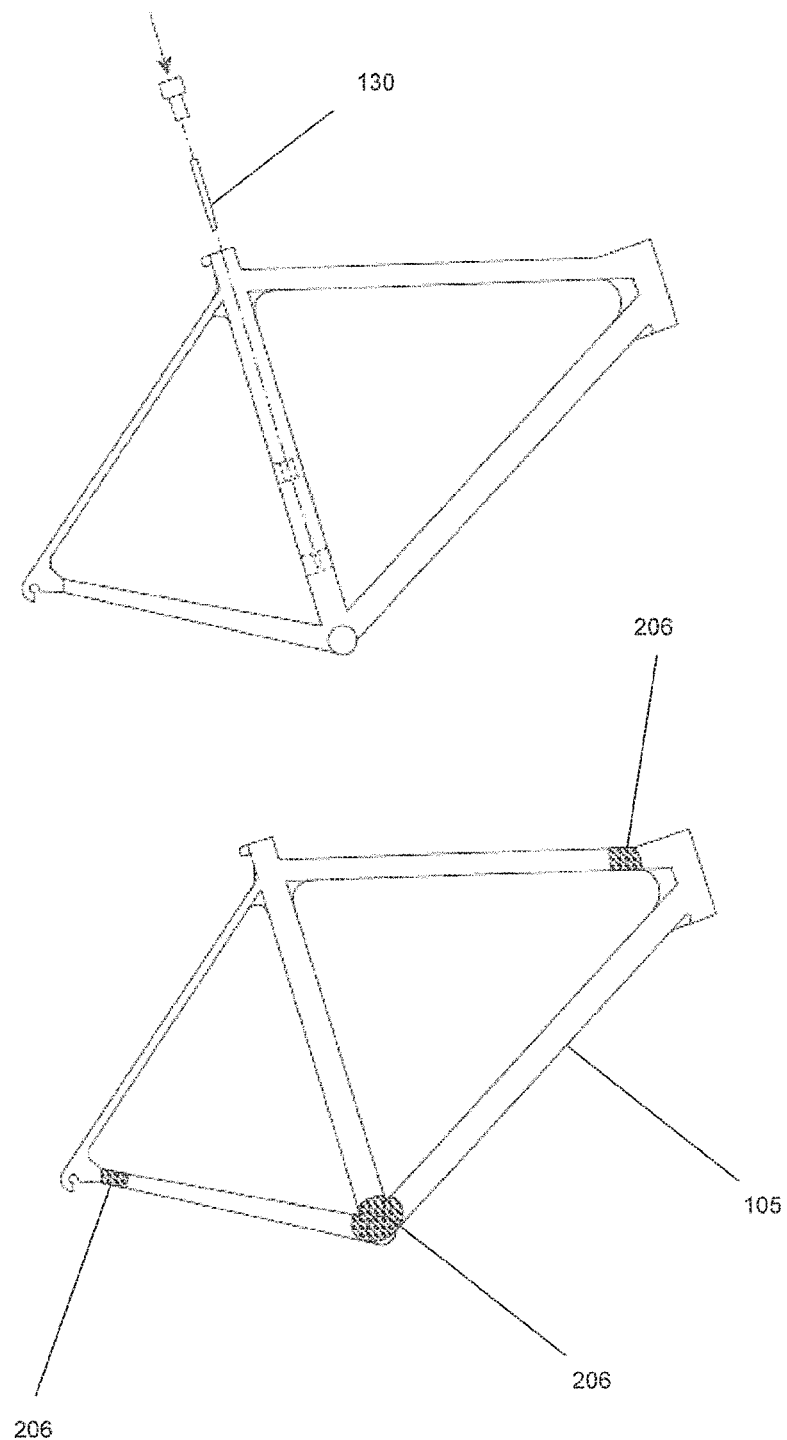
FIG. 10 illustrates an alternative embodiment of the bicycle frame comprising a transmission mechanism wherein sections of integral frame of the bicycle are of a non conducting electromagnetic material.
Figure 11:
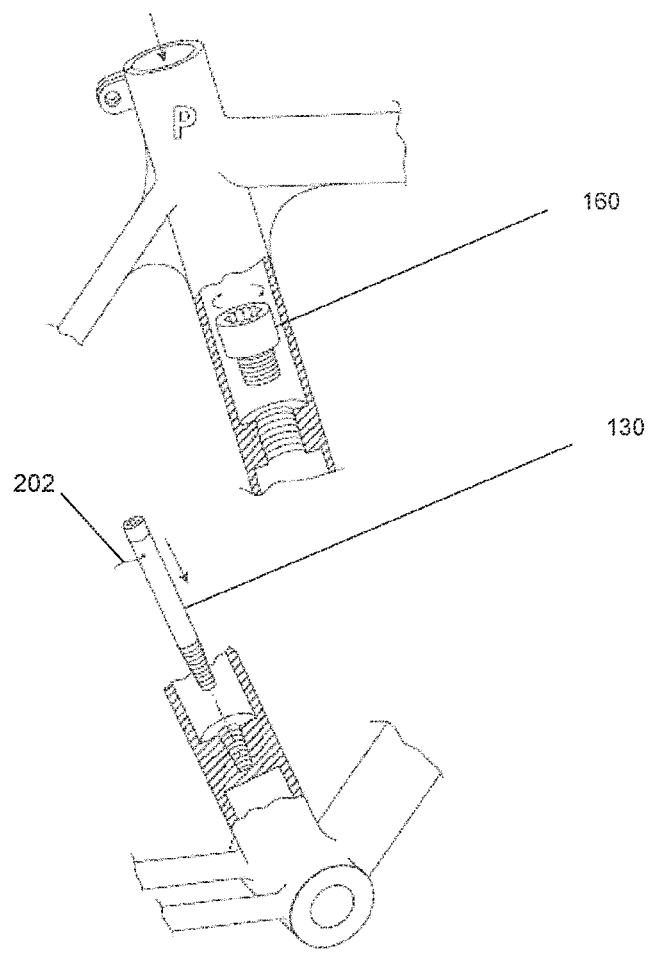
FIG. 11 illustrates a magnified view of the bicycle security system of FIG. 8 in situ within an integral member of the bicycle frame.

In an alternative embodiment as best illustrated in FIG. 10, the transmission mechanism is in the form of a bicycle frame 100 which comprises sections 206 of non conducting electromagnetic material. These non conductive sections 206 will break up the continuos layer of conductive material within which the bicycle security system 130 (and therefore the communication module 170) are encased and thus mitigate the Faraday shield effect.

Figure 6:
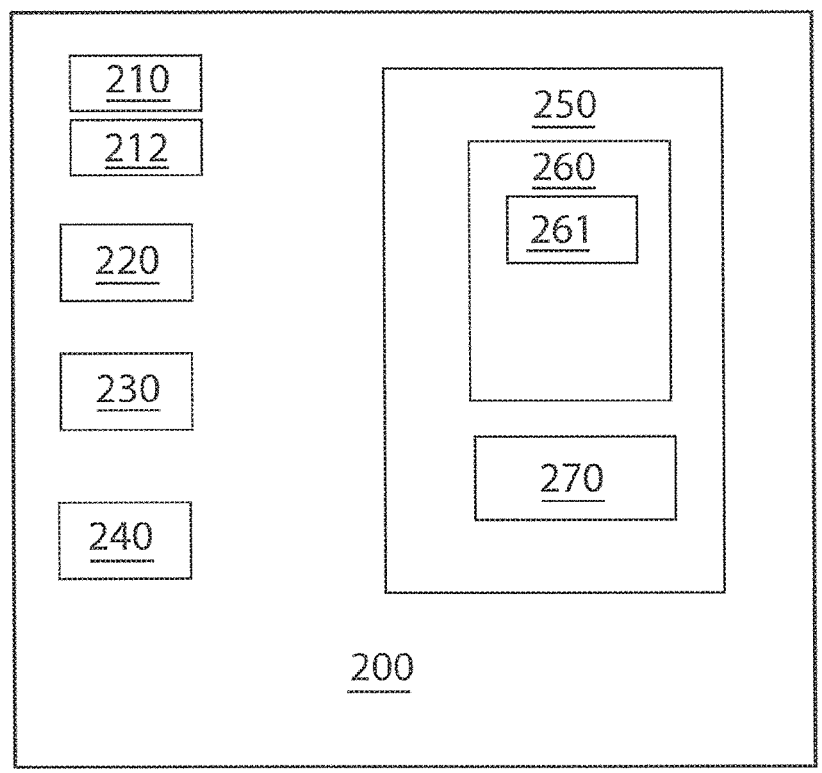
FIG. 6 is a diagrammatic view of a detail of the bicycle security system in accordance with the present teaching.
Figure 7:
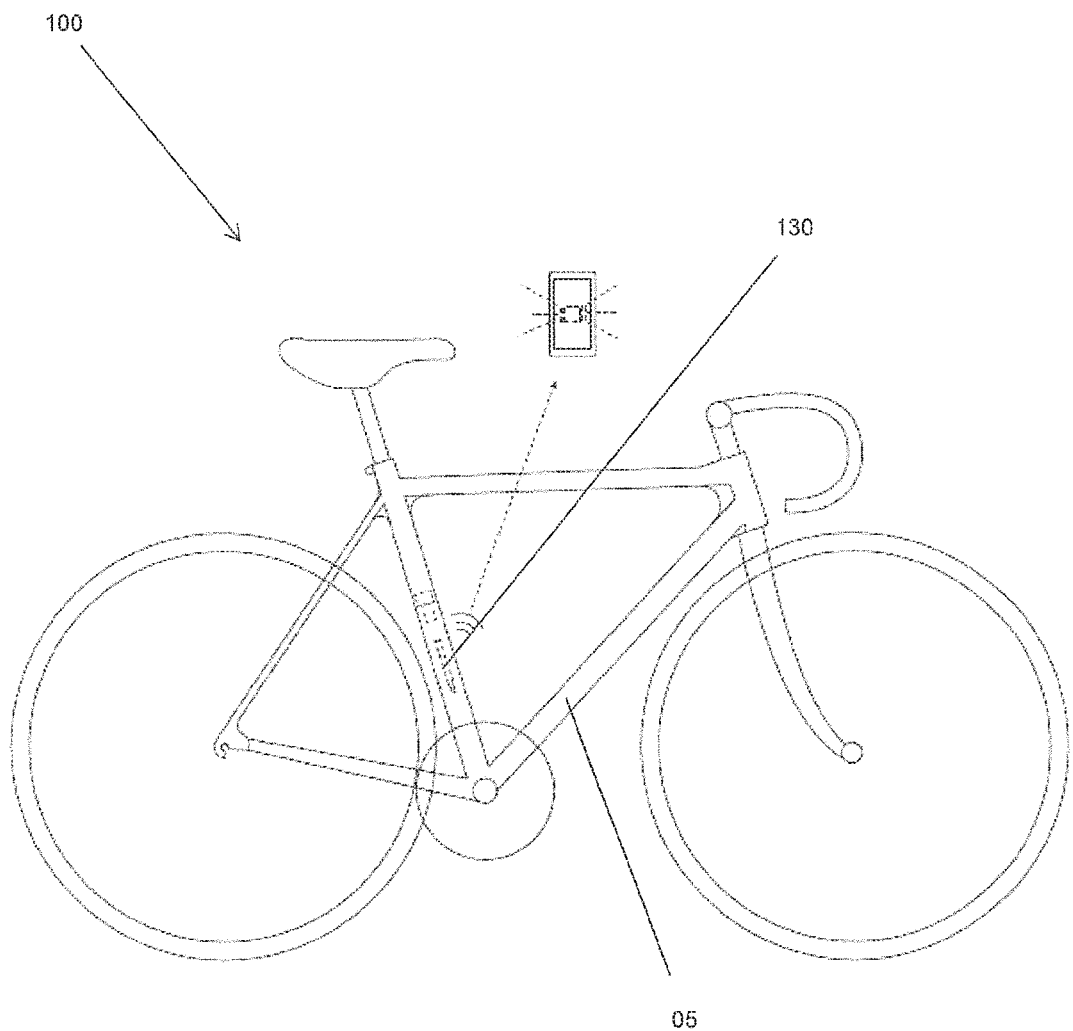
FIG. 7 illustrates a side elevation view of an alternative bicycle frame design which accomodates the bicycle security system in accordance with the present teaching.

FIG. 6 is a block diagram illustrating a configuration of a mobile device 200 according to an embodiment of the present disclosure. The mobile device 200 may be configured to control the alarm circuit 140. The mobile device 200 includes various hardware and software components that function to perform the methods according to the present disclosure. The mobile device 200 comprises a user interface 210, a processor 220 in communication with a memory 250, and a communication interface 230. The processor 220 functions to execute software instructions that can be loaded and stored in the memory 250. The processor 220 may include a number of processors, a multi-processor core, or some other type of processor, depending on the particular implementation. The memory 250 may be accessible by the processor 220, thereby enabling the processor 220 to receive and execute instructions stored on the memory 250. The memory 250 may be, for example, a random access memory (RAM) or any other suitable volatile or non-volatile computer readable storage medium. In addition, the memory 250 may be fixed or removable and may contain one or more components or devices such as a hard drive, a flash memory, a rewritable optical disk, a rewritable magnetic tape, or some combination of the above.

One or more software modules 260 may be encoded in the memory 250. The software modules 260 may comprise one or more software programs or applications having computer program code or a set of instructions configured to be executed by the processor 220. Such computer program code or instructions for carrying out operations for aspects of the systems and methods disclosed herein may be written in any combination of one or more programming languages.

The software modules 260 may include an app 261 configured to be executed by the processor 220 in order to remotely control the alarm circuit 140. During execution of the software modules 260, the processor 220 configures the mobile device 200 to perform various operations relating to controlling the alarm circuit 140 according to embodiments of the present disclosure, as has been described above.

Other information and/or data relevant to the operation of the present systems and methods, such as a database 270, may also be stored on the memory 250. The database 270 may contain and/or maintain various data items and elements that are utilized throughout the various operations of controlling the alarm circuit 140. It should be noted that although the database 270 is depicted as being configured locally to the mobile device 200, in certain implementations the database 270 and/or various other data elements stored therein may be located remotely. Such elements may be located on a remote device or server—not shown, and connected to the mobile device 200 through a network in a manner known to those skilled in the art, in order to be loaded into a processor and executed.

Further, the program code of the software modules 260 and one or more computer readable storage devices (such as the memory 250) form a computer program product that may be manufactured and/or distributed in accordance with the present disclosure, as is known to those of skill in the art.

The communication interface 240 is also operatively connected to the processor 220 and may be any interface that enables communication between the mobile device 200 and the controller 156 of the alarm circuit 140. The communication interface 240 is configured for transmitting and/or receiving data. For example, the communication interface 240 may include but is not limited to a Bluetooth, or cellular transceiver, a satellite communication transmitter/receiver, an optical port and/or any other such, interfaces for wirelessly connecting the mobile device 100 to the controller 156 of the alarm circuit 140. The user interface 210 is also operatively connected to the processor 120. The user interface may comprise one or more input device(s) such as switch(es), button(s), key(s), and a touchscreen.

The user interface 210 functions to allow the entry of certain information about operating the bicycle security system. The user interface 210 functions to facilitate the capture of commands from the user such as an on-off commands or settings related to operation of the alarm circuit 140.

A display 212 may also be operatively connected to the processor 220. The display 212 may include a screen or any other such presentation device that enables the user to view various options, parameters, and results. The display 212 may be a digital display such as an LED display. The user interface 210 and the display 212 may be integrated into a touch screen display.

The operation of the mobile device 200 and the various elements and components described above will be understood by those skilled in the art with reference to the method and system for delivering options to a user for controlling the alarm circuit 140 according to the present disclosure.

In use, a user may active the alarm circuit 140 via the app 261. Light emitting diodes are switched on to indicate that the bicycle security system 130 is activated. In the event that thief attempts to steal the bicycle 100 the alarm mechanism 145 will sound an alarm if the tilt of the bicycle 100 is greater than a predetermined threshold. The security system 130 therefore deters thieves from stealing the bicycle.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly the words comprises/comprising when used in the specification are used to specify the presence of stated features, integers, steps or components but do not preclude the presence or addition of one or more additional features, integers, steps, components or groups thereof.

The invention claimed is:

1. A bicycle security system mounted within a bicycle comprising:
   an alarm circuit having an alarm mechanism with a wireless communication interface;
   a sensor for sensing a relative displacement of the bicycle from a first position, the sensor being in communication with the alarm mechanism to activate the alarm mechanism if the bicycle is displaced beyond a predetermined threshold from the first position;
   a power source for powering the alarm circuit; and a housing for accommodating the alarm circuit therein, wherein the housing is configured to be mounted internally within a bicycle frame of the bicycle, wherein the alarm circuit further comprises a transmitting mechanism which comprises an antenna connected to a conducting wire which extends between a communication module of the alarm circuit within an interior of the bicycle frame and an exterior of the bicycle frame thereby facilitating wireless transmission from the interior of the bicycle to the exterior of the bicycle via the antenna and vice versa; the transmitting mechanism further comprises a fastener with a tensioning mechanism to mount the transmitting mechanism through one of perforations in the bicycle frame; and wherein the tensioning mechanism is a wire coil thereby forming the antenna of the alarm circuit.

2. The bicycle security system as claimed in claim 1, wherein the housing is configured to mate with a threaded portion formed integrally with the bicycle frame during manufacturer thereof.

3. The bicycle security system as claimed in claim 1, wherein said transmitting mechanism allows communication from the communication module on the interior of the bicycle frame to the exterior of the bicycle frame via sections of the bicycle frame which are made of a material which facilitates wireless transmission there through.

4. The bicycle security system as claimed in claim 3, wherein the material is non-conductive.

5. The bicycle security system as claimed in claim 1, further comprising a screw for engaging with a threaded portion formed inside one end of an integral member of the bicycle frame.

6. The bicycle security system as claimed in claim 1, further comprising a controller configured for facilitating remote control of the alarm circuit.

7. The bicycle security system as claimed in claim 6, wherein the controller comprises a communication module to facilitate remote control using a mobile phone.

8. The bicycle security system as claimed in claim 7, wherein the communication module is compatible with wireless technology.

9. The bicycle security system as claimed in claim 1, further comprising a security mechanism to secure the housing within the bicycle frame, and optionally the security mechanism permanently secures the housing within the bicycle frame.

10. The bicycle security system as claimed in claim 9, wherein the security mechanism comprises a lock nut.

11. The bicycle security system as claimed in claim 1, wherein the alarm mechanism comprises at least one of an audible alarm and a visually perceptible alarm.

12. The bicycle security system as claimed in claim 11, wherein the housing has one or more apertures formed thereon such that the visually perceptible alarm is visible externally of the housing.

13. The bicycle security system as claimed in claim 1, further comprising a tracking mechanism operable to track a geographical location of the bicycle.

14. The bicycle security system as claimed in claim 1, wherein the housing comprises at least one of a mounting means to mate with the bicycle frame, the mounting means comprising inter-engageable complimentary formations, and the mounting means comprising a screw for engaging with a threaded portion formed on the bicycle frame.

15. The bicycle security system as claimed in claim 1, wherein the power source comprises at least one of a battery, a rechargeable battery, and a battery operably coupled to a dynamo for facilitating charging thereof.

16. A bicycle comprising a bicycle security system, wherein the bicycle security system comprises:

an alarm circuit having an alarm mechanism with a wireless communication interface;

a sensor for sensing a relative displacement of the bicycle from a first position, the sensor being in communication with the alarm mechanism to activate the alarm mechanism if the bicycle is displaced beyond a predetermined threshold from the first position;

a power source for powering the alarm circuit; and a housing for accommodating the alarm circuit therein, wherein the housing is configured to be mounted internally within a bicycle frame of the bicycle, wherein the alarm circuit further comprises a transmitting mechanism which comprises an antenna connected to a conducting wire which extends between a communication module of the alarm circuit within an interior of the bicycle frame and an exterior of the bicycle frame thereby facilitating wireless transmission from the interior of the bicycle to the exterior of the bicycle via the antenna and vice versa; the transmitting mechanism further comprises a fastener with a tensioning mechanism to mount the transmitting mechanism through one of perforations in the bicycle frame; and wherein the tensioning mechanism is a wire coil thereby forming the antenna of the alarm circuit.

17. The bicycle as claimed in claim 16 comprising a threaded portion formed integrally within an integral section of the bicycle frame during manufacturer thereof for mating with the housing of the bicycle security system.

18. The bicycle as claimed in claim 16 wherein the transmitting mechanism allows communications from the communication module of the interior of the bicycle frame to the exterior of the bicycle frame via sections of the bicycle frame which are made of a material which facilitates wireless transmission there through; wherein the material is non-conductive.

* * * * *